Figure 1:
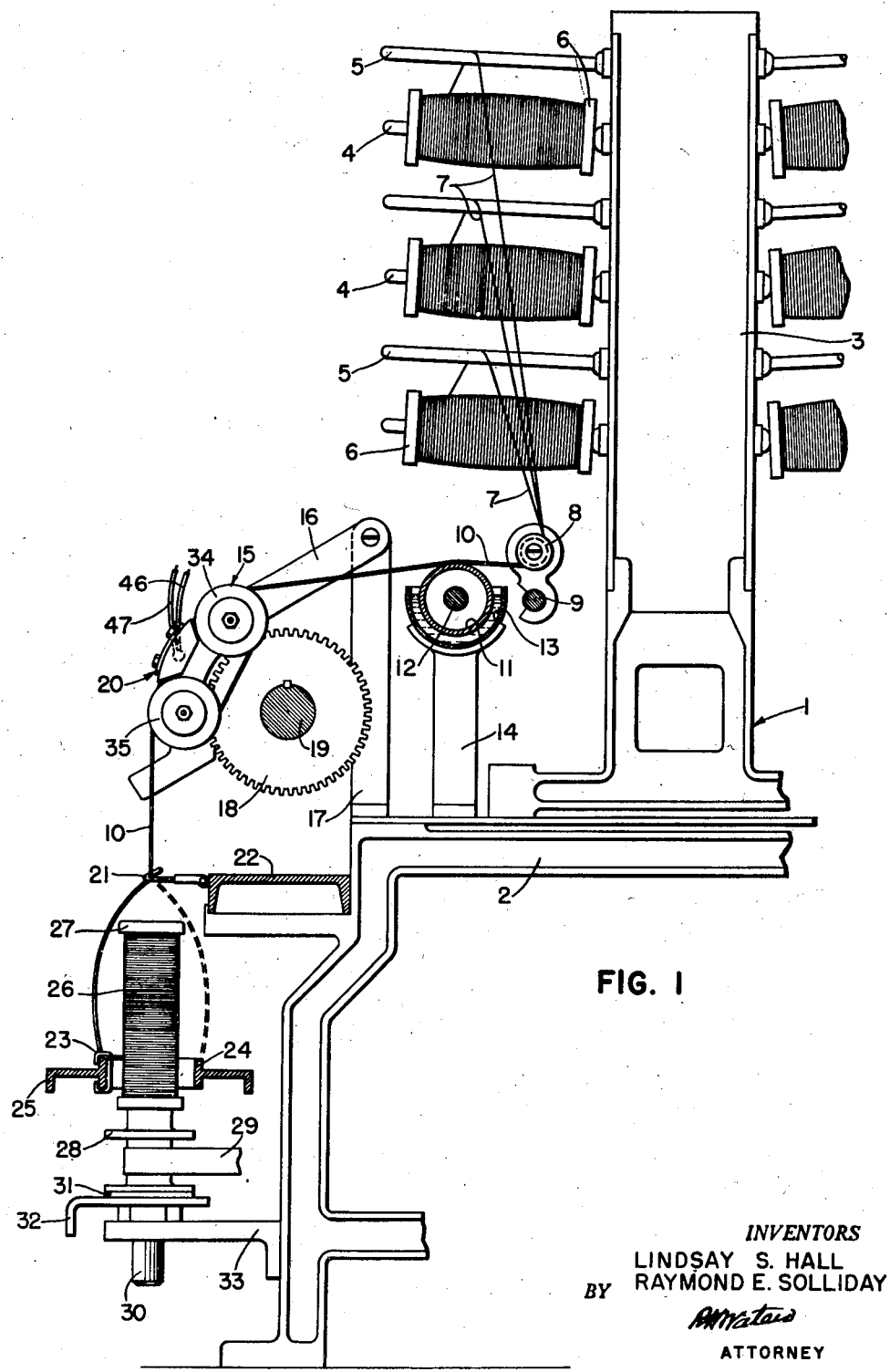

March 15, 1949.            L. S. HALL ET AL            2,464,502
                        CORD PROCESSING APPARATUS
Filed July 30, 1946                                    2 Sheets-Sheet 1

INVENTORS
LINDSAY S. HALL
BY RAYMOND E. SOLLIDAY
ATTORNEY

March 15, 1949.   L. S. HALL ET AL   2,464,502
CORD PROCESSING APPARATUS
Filed July 30, 1946                    2 Sheets-Sheet 2

INVENTORS
LINDSAY S. HALL
RAYMOND E. SOLLIDAY
BY
ATTORNEY

Patented Mar. 15, 1949

2,464,502

UNITED STATES PATENT OFFICE 2,464,502

CORD PROCESSING APPARATUS

Lindsay S. Hall, Pawtucket, R. I., and Raymond E. Solliday, Akron, Ohio, assignors to Wingfoot Corporation, Akron, Ohio, a corporation of Delaware Application July 30, 1946, Serial No. 687,144

5 Claims. (Cl. 57—34)

1

The present invention relates to an improved apparatus for use in the manufacture of doubled and twisted thread, yarn, cord, and the like. More particularly, the invention pertains to a device which, when employed in combination with conventional forms of stretching devices on thread doubling and twisting apparatus, serves to introduce a burnishing effect in the finished thread which insures a product of uniform gauge and increased tensile strength having a smooth finish entirely free from projecting fibers.

While the apparatus of the present invention is adapted to be employed in the manufacture of thread, yarn, cord, and the like, it is particularly advantageously adapted to be employed in the production of reinforcing cord for use in the manufacture of tires, belts, and other forms of mechanical rubber goods as well as other related products. A smooth burnished finish as well as a uniform gauge are desirable attributes of such cords. One of the important considerations in the manufacture of reinforcing cord for tires and other cord-reinforced rubber articles is the achievement of a material reduction in gauge and weight of the cord without affecting its tensile strength.

It is, therefore, an object of the present invention to provide means for producing a high-quality thread characterized by a uniform gauge and tensile strength.

It is another object of the present invention to provide a form of device which may be applied to conventional forms of stretching apparatus commonly employed in doubling and twisting machines for manufacturing thread, yarn, cord, and the like characterized by a smooth burnished finish.

It is a further object of the present invention to provide a device for producing a drying and burnishing effect upon a double thread as the cord is being stretched and preferably prior to the twisting operation so as to facilitate the drawing or working in of all of the loose fibers which may be present in the component elements of the thread.

Another object of the present invention is to provide a means for effecting a simultaneous drying and ironing action upon a doubled thread, yarn, cord, and the like by the application of heat so as to produce a product having a smooth finish and characterized by a high uniform tensile strength and embodying all of the features known to be desirable for incorporation of the

2 product in vulcanized rubber products such, for example, as pneumatic tires and the like.

Other objects and advantages of the present invention will become apparent as the description of one form of apparatus illustrated in the accompanying drawings proceeds.

Figure 2:
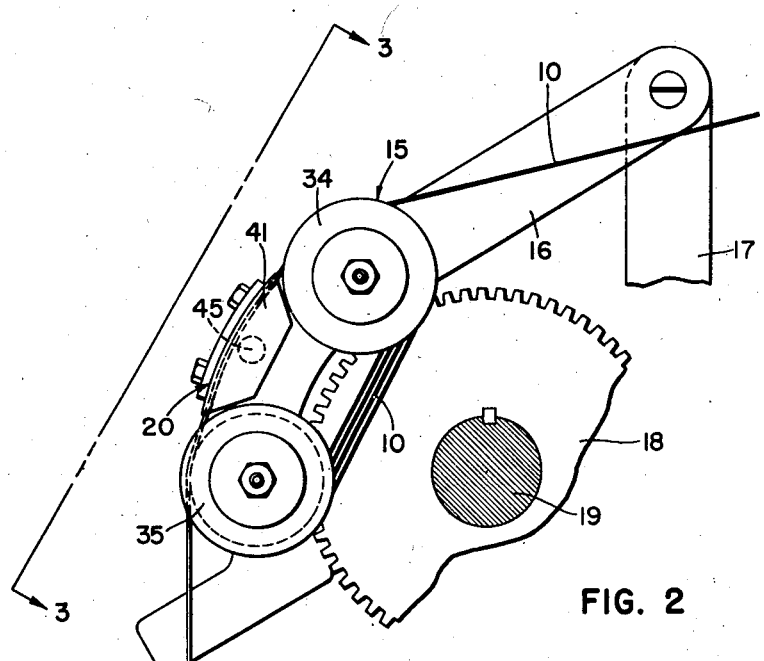
Figure 3:
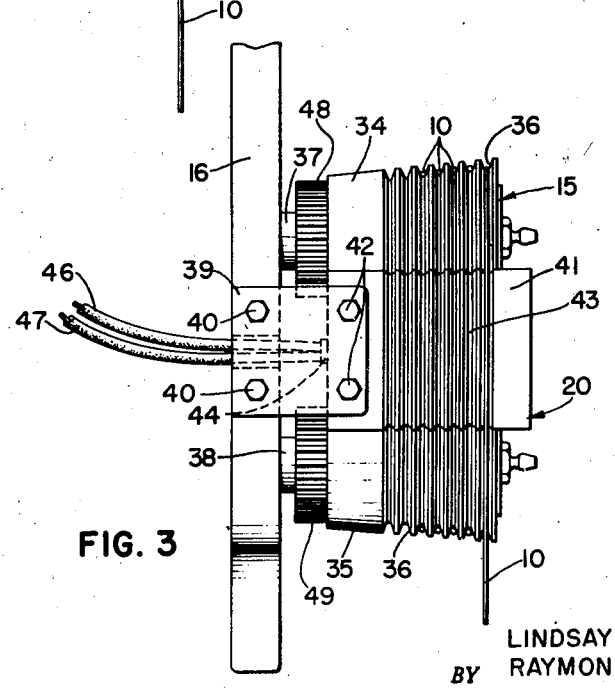

In the drawings, Fig. 1 represents a partial end elevation of a typical form of doubler-twister apparatus with which the device of the present invention is advantageously employed. Fig. 2 is an elevation at a somewhat larger scale of the stretching apparatus employed in the doubler-twister machine illustrated in Fig. 1 showing a typical form of burnishing apparatus embodying the principles of the present invention. Fig. 3 is a plan view of the apparatus illustrated in Fig. 2 as seen from the line 3—3 therein.

In Fig. 1 of the drawings, the reference numeral 1 indicates generally a conventional form of doubler-twister apparatus employed in the manufacture from a plurality of individual threads of thread, yarn, cord, and the like, hereinafter referred to simply as "cord." In such operations the individual threads are plied together, treated with a suitable form of bonding agent or adhesive, and finally twisted into a single cord. The doubler-twister apparatus 1 comprises, among other things, a frame 2 on which is mounted a spindle support 3. The support 3 carries a plurality of spindles 4 and guide bars 5 which are arranged in substantially vertical rows and disposed in spaced, mutually parallel relation so as to extend horizontally or generally normal to the spindle support 3.

Each of the spindles 4 has mounted thereon a supply spool 6 which provides an individual strand or thread end for incorporation into a finished doubled and twisted cord. The several threads 7 extend from the supply spools 6 over the guide bars 5 and are then directed to a combining guide 8, one of which is provided for each vertical row of supply spools 6. The combining guide 8 is adjustably supported by a longitudinally extending rod 9 supported in any suitable fashion from the end frames 2 of the machine. Each series of strands or threads 7 is caused to be gathered in plied relation by the combining guide 8 into a composite cord 10 which is thereafter subjected to any one of several different processing treatments after which it is twisted into a finished cord.

In the manufacture of a typical composite cord, the cord 10 embodying the several plied threads 7 is customarily passed over a freely rotatably mounted roller 11 which is supported by a longitudinally extending shaft 12 in such a way as to enable it to dip into a shallow trough or tank 13 containing a suitable processing liquor. It will be readily understood that this processing liquor may be any one of several different kinds of adhesive materials or lubricating media which will facilitate the twisting together of the individual threads into the finished cord and aid in securing any protruding fiber ends or loose fibers in place. These processing treatments may serve any one of a number of different purposes, but that applied to the cord 10 in the present instance is chiefly for the purpose of promoting a smooth burnished effect upon the surface of the finished cord as well as an enhanced tensile strength.

The cord processing apparatus of the present invention embodies a stretching mechanism 15 which receives the cord 10 after it has passed over the roller 11. The stretching mechanism 15 comprises a pair of spaced generally frusto-conically shaped rollers or cones having a plurality of V-shaped notches on the peripheries thereof for advancing the cord 10 axially therealong in a plurality of generally helical turns. A swingably mounted arm 16, supported by a bracket 17 secured to the frame 2 of the doubler-twister apparatus 1, serves to support the stretching mechanism 15 in driving relation to a drive gear 18 mounted upon a longitudinally extending drive shaft 19 rotatably supported upon the frame 2 of the apparatus. The drive shaft 19 is advantageously driven by means of suitable gearing from the same motor which operates the other elements of the doubler-twister apparatus.

A burnishing means 20 is associated with the stretching mechanism 15 and is also supported by the swingably mounted arm 16. The burnishing means 20 is advantageously disposed in the manner illustrated in Fig. 3 enabling it to receive the cord 10 as it traverses the stretching mechnism 15, thereby accomplishing the burnishing operation as the cord is being stretched upon the stretching mechanism. From the stretching mechanism 15 the cord passes downwardly to a pigtail guide 21 which is secured to a channel member 22 extending longitudinally of the machine and supported by the frame members 2 thereof.

After passing through the pigtail guide 21, the cord 10 is inserted through a traveler 23 mounted for rotation upon a ring 24 forming part of the ring rail 25. The cord 10, after passing through the traveler 23, is collected in twisted form as a precision-wound package 26 upon a spool or bobbin 27 which is rotatably mounted upon a pulley 28. The pulley 28 is rotated at high speed as by means of a belt 29 about the axis of a stub shaft 30 and rotatably supported by a bearing 31 which is in turn supported by the stationary rail member 32 extending lengthwise of the machine and mounted upon a plurality of brackets 33 secured to the frame members 2 of the doubler-twister apparatus 1.

It will be readily understood that the twister section of the doubler-twister apparatus 1 embodies a complete assembly of the type described for each of the composite cords 10 produced upon the apparatus, and that the mechanism operates in a conventional manner. As the cord passes through the traveler 23 which is caused to follow the ring 24, it is twisted and collected in finished form ready for use as a reinforcing cord in vulcanized rubber products. The ring rail 25 is so mounted that it will reciprocate axially with respect to the rapidly rotating spool 27 to enable the laying up of the package 26 of the cord 10 thereon.

As previously indicated, the stretching mechanism 15 comprises a pair of spaced grooved rollers 34 and 35. The rollers or cones 34 and 35 actually take the form of frusto-conical segments having a plurality of V-shaped notches or grooves 36 formed in the periphery thereof. The cones 34 and 35 are supported from a single end only thereof, being secured to the swingable arm 16 for rotation about the pins 37 and 38 by means of gears 48 and 49 which mesh with the drive gear 18 when the arm 16 is in its lowered position. It will be understood that the cord 10 is received upon the cones 34 and 35 at the supported ends thereof in the grooves 36 and advanced from one to another of said grooves in the form of a helix of gradually increasing diameter, thereby insuring a positive advance of the cord from one end to the other of the device once it is threaded up.

The burnishing means 20 is advantageously supported from the swingable arm 16 as by means of the plate 39 and held in place thereon by machine screws 40. The plate 39 is secured to the grooved guide portion 41 as by means of the machine screws 42. The guide portion 41 is advantageously of slightly arcuate form as indicated in Fig. 2 of the drawings and has upon the arcuate surface thereof a plurality of parallel V-shaped grooves 43 which cooperate with the V-shaped grooves 36 of the cones 34 and 35 of the stretching mechanism 15 to support the cord 10 which is discharged from the cone 34 and passed to the cone 35. It will be readily understood that the burnishing means 20 may be disposed in any desired position with respect to the cones 34 and 35 of the stretching mechanism 15 just as long as it is enabled to contact a substantial portion of the over-all length of the cord 10 while it is being stretched upon the stretching mechanism.

The guide portion 41 of the burnishing means 20 is adapted to be heated as by means of an electrical heating element 44 inserted in a bore 45 formed therein and extending substantially at right angles to the V-shaped grooves 43 in the arcuate surface of the guide portion. The heating element 44 is supplied with electrical current from a suitable source by means of the electrical conductors 46 and 47. Thus, it will be understood that the guide portion 41 is heated electrically to enable it to dry and produce the desired burnishing effect upon the cord 10 as it passes through the V-shaped grooves 43 in its arcuate surface and in its path from the cone 34 to the cone 35 of the stretching mechanism 15.

The finished cord, collected in the form of a precision-wound package 26, is thus dried and burnished, presenting a smooth surface free from projecting fibers or filaments comprising the threads 7 of which it is made up. The product is highly advantageous for use in the manufacture of vulcanized rubber products which require the incorporation of reinforcing elements therein. The heated guide portion 41 of the burnishing means 20 thus accomplishes the purpose of drying the processing liquor applied to the composite cord 10 by the roller 11 as well as the desired ironing effect which produces the smooth outer surface for the finished cord.

It will be readily understood that certain modifications may be made in the apparatus of the present invention without in any way departing from the spirit or scope of the invention. It has already been indicated that the burnishing means 20 may be disposed in any of several different positions with respect to the cones 34 and 35 of the stretching mechanism 15 without materially affecting its operation or effectiveness, it being essential that only a portion of the cord 10 pass over its surface in the course of the stretching operation.

While in accordance with the Patent Statutes one best known embodiment of the invention has been illustrated and described in detail, it is to be particularly understood that the invention is not limited thereto or thereby, but that the inventive scope is defined in the appended claims.

We claim:

1. In cord processing apparatus, a stretching device for advancing cord generally in the form of a helix embodying a plurality of turns of progressively increasing circumference; guide means disposed in the path of the cord upon the stretching device for the reception of at least one turn of the cord as it traverses the stretching device; and means for heating the guide means.

2. In cord processing apparatus, a stretching device adapted to receive the cord and advance the same in a plurality of generally helical turns of progressively increasing diameter; guide means disposed in the path of the cord upon the stretching device for the reception therein of each succeeding turn of cord as it traverses the stretching device; and means heating the guide means.

3. Cord processing apparatus comprising a stretching device for cord and the like having a pair of spaced frusto-conically shaped grooved rollers, burnishing means associated with the stretching device, said burnishing means having a plurality of grooves corresponding generally to those of the rollers, and means imparting heat to the burnishing means.

4. Cord processing apparatus comprising a stretching device for cord and the like having a pair of spaced frusto-conically shaped grooved rollers, each of said grooves supporting a turn of cord; burnishing means disposed in the path of the cord over the stretching device for contact therewith as it is stretched; and means for heating the burnishing means.

5. Cord processing apparatus comprising a stretching device for cord and the like having a pair of spaced frusto-conically shaped grooved rollers, each of said grooves supporting a turn of cord; burnishing means disposed in the path of the cord in its passage between the rollers of the stretching device, said burnishing means having a number of grooves corresponding substantially to that of the stretching device in each of which grooves a turn of the cord is received as it passes from one to the other of the rollers of the stretching device in its path of travel thereon; and means heating the burnishing means.

LINDSAY S. HALL.
RAYMOND E. SOLLIDAY.

REFERENCES CITED

The following references are of record in the file of this patent:

UNITED STATES PATENTS

| Number | Name | Date |
| --- | --- | --- |
| 2,256,150 | Mallory | Sept. 16, 1941 |
| 2,310,951 | Greene | Feb. 16, 1943 |
| 2,336,100 | Jacque | Dec. 7, 1943 |
| 2,365,069 | Grimes, Sr. | Dec. 12, 1944 |
| 2,400,325 | Winslow | May 14, 1946 |
| 2,407,358 | Whisnant | Sept. 10, 1946 |